United States Patent [19]

Spiesser

[11] Patent Number: 4,983,868
[45] Date of Patent: Jan. 8, 1991

[54] DISENGAGEABLE LINEAR STEPPER MOTOR

[75] Inventor: Gilbert Spiesser, Ales, France

[73] Assignee: Sextant Avionique, Montrouge, France

[21] Appl. No.: 325,967

[22] Filed: Mar. 20, 1989

[30] Foreign Application Priority Data

Mar. 21, 1988 [FR] France ................. 88 03779

[51] Int. Cl.$^5$ ............................. H02K 37/14
[52] U.S. Cl. ............................. 310/49 R; 310/87
[58] Field of Search .......... 310/12, 49 R, 85, 86, 310/87, 88, 89; 417/352, 353, 357; 335/260, 278, 292; 384/477, 489

[56] References Cited

U.S. PATENT DOCUMENTS

| 2,535,695 | 12/1950 | Pezzillo, Jr. | 417/357 |
| 2,780,740 | 2/1957 | Roman et al. | 310/67 |
| 4,115,040 | 9/1978 | Knorr | 417/420 |

FOREIGN PATENT DOCUMENTS 0078740 10/1982 European Pat. Off.
1167431 4/1964 Fed. Rep. of Germany.

Primary Examiner—Steven L. Stephan
Assistant Examiner—Judson H. Jones
Attorney, Agent, or Firm—Stevens, Davis, Miller & Mosher

[57] ABSTRACT

A disengageable linear stepper electric motor is provided comprising a multipole stator in the bore of which a rotor of smaller diameter revolves cycloidally, and sealing means for isolating the stator environment and so the environment outside the motor from the rotor environment.

3 Claims, 2 Drawing Sheets

DISENGAGEABLE LINEAR STEPPER MOTOR

BACKGROUND OF THE INVENTION

1. Field of the Invention

The present invention relates to disengageable linear stepper electric motors of the type comprising a multipole stator in the bore of which a rotor of smaller diameter revolves cycloidally.

To transform this rotational movement into a linear axial movement, the bore of the stator is tapped whereas the rotor comprises on its peripheral portion parallel scores or else a thread compatible with the tapping of the stator. A drive rod, axially fast with the rotor, is thus driven in linear translation.

2. Description of the Prior Art

Motors of this type are already known, an example is described in the European patent application No. 0 078 740.

Such devices are used particularly for controlling regulation systems. In these systems, the drive rod, which moves linearly and step by step controls regulation members. It is often called control rod.

A characteristic of these devices is that, if special precautions are not taken, the motor bathes in the gas or liquid medium to be regulated.

This is of little importance when this medium is air, for example, but the same cannot be said when this medium comprises dangerous, particularly explosive, liquids or gases.

In this case, since the stator environment is an electrically active environment, there is a danger of explosion. In addition, it is generally necessary that the motor does not offer to the dangerous liquid or gas a passage to the outside environment which must remain protected.

SUMMARY OF THE INVENTION

The object of the invention is to overcome this drawback.

For this, it provides a disengageable linear stepper electric motor comprising a multipole stator in the bore of which a rotor of smaller diameter revolves cycloidally, comprising sealing means disposed between the rotor environment and the stator environment for isolating said stator environment and so the environment outside the motor, from said rotor environment.

The rotor volume of the motor of the invention may thus communicate freely with a volume containing a dangerous gas or liquid, without the result being a danger of explosion, or leaking of this gas or liquid to the outside.

Advantageously, the sealing means comprise resilient means and rigid means for supporting said resilient means and compressing them against two cylindrical annular surfaces integral respectively with the two ends of the bore of said stator and against the edges of two cylindrical sleeves housing said rotor.

As will be better understood hereafter, such an arrangement is compatible with a stator having reduced thickness in the between pole gaps, which improves the performances of the motor.

Advantageously again, said rigid means comprise bearing rings with L shaped section and said resilient means comprise O seals.

BRIEF DESCRIPTION OF THE DRAWINGS

The present invention will be better understood from the following description of the preferred embodiment of the motor of the invention with reference to the accompanying drawings in which.

DESCRIPTION OF THE PREFERRED EMBODIMENT

Figure 1:
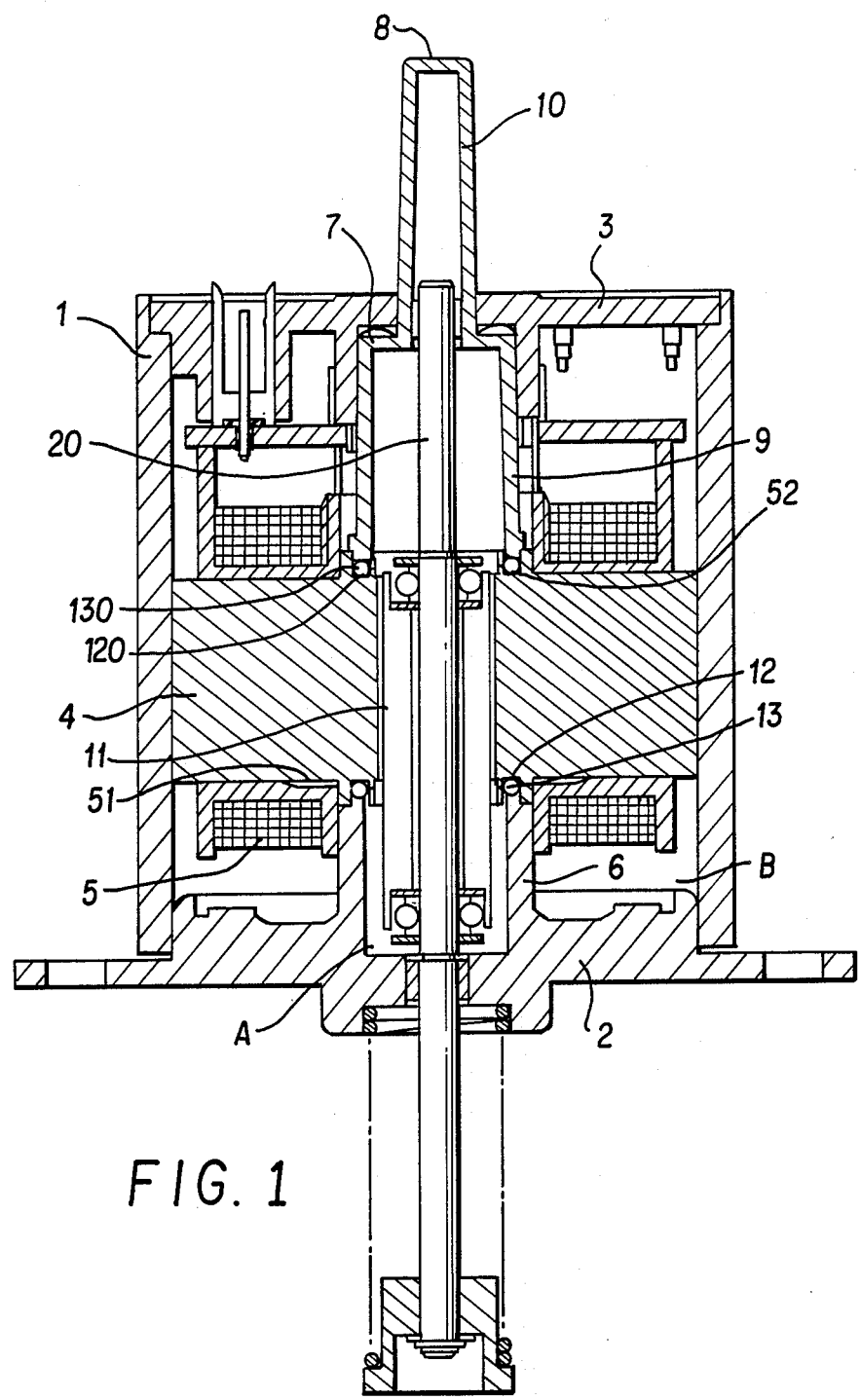
FIG. 1 is a general axial sectional view of the motor of the invention.

Referring to the figures, a motor comprises a cylindrical carcase 1, closed on one side by a front flange 2 and on the other side by a rear flange 3. Inside the carcase 1 a stator 4 is fitted, in a substantially median position, having a cylindrical bore and four poles disposed in the form of a cross, whose arms are offset by 90° with respect to each other. Each of the four arms is surrounded by a coil 5 fed with electric power so as to provide operation of the motor.

The front flange 2 comprises a tubular extension forming a sleeve 6 extending inwardly of the motor in a direction perpendicular to the plane of said flange so as to cooperate by contact with the front face 51 of the stator 4, as will be explained further on.

Similarly, the rear face 52 of stator 4 cooperates with a frusto-conical sleeve 7 closed at its opposite end 8. This sleeve 7 comprises two portions 9, 10 of different mean diameters in the extension of each other and of substantially equivalent heights, the first portion 9 housed inside the motor has an inner diameter substantially greater than that of the bore of the stator and a height at least equal to the stroke of the rotor in its operation when passing from an endmost position to its other endmost position. The second portion 10 of smaller mean diameter has an inner diameter substantially greater than that of a drive rod 20 fast axially with the rotor 11 and its height is at least equal to the maximum stroke of rotor 11. The drive rod or control rod 20 is intended to control a regulation member, not shown, for example.

The rear flange 3 of the motor of a generally circular shape has at its center a bore substantially greater than the outer diameter of portion 10 of sleeve 7 and cooperates with said sleeve 7 by bearing against the shoulder formed by the circular ring resulting from the difference of respective outer diameters of portions 9 and 10 of sleeve 7, so as to hold it in abutment against the rear face 52 of stator 4.

Figure 3:
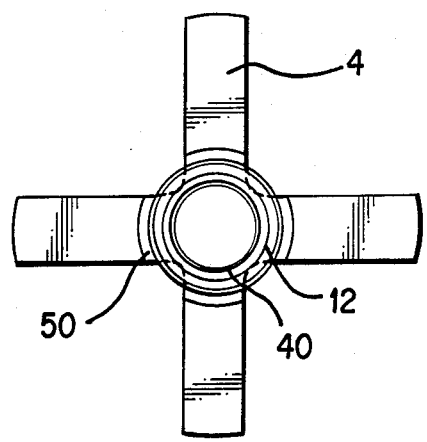
FIG. 3 is a front view of the stator of the motor of FIG. 1.

Referring to FIG. 3, so as to make the magnetic flux towards the rotor 11 maximum, the thickness of the stator in the gaps between poles, i.e. in the bisector planes of the angles formed by the planes of the four stator poles, is reduced to a minimum and does not allow an efficient surface to be provided for a seal which would be disposed against the flat ends of the stator.

Figure 2:
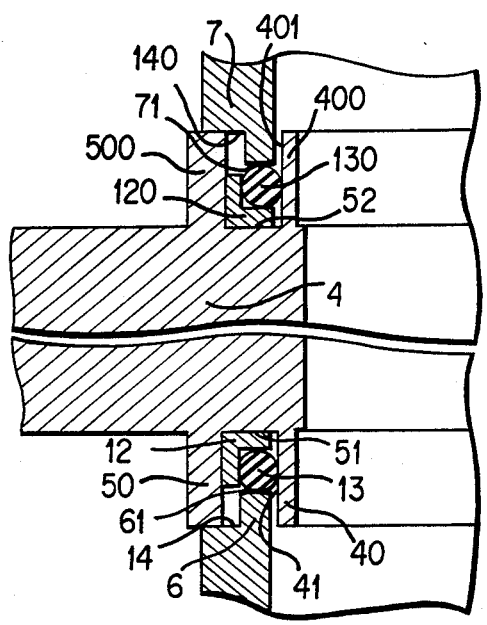
FIG. 2 is a detailed partial section showing the arrangement of the seals of the motor of FIG. 1.

To overcome this drawback, and as shown in FIG. 2, which is an enlarged view of two details of the left-hand portion of FIG. 1, two rigid rings 12 and 120 with an L shaped section having two legs of substantially equal lengths and of a diameter substantially greater than the diameter of the bore of stator 4 are placed on each side of the latter and along the same axis. The portion in the form of a flat annulus of the two rings 12, 120 bears respectively on the front 51 and rear 52 faces of the stator. The cylindrical shaped part of the two rings 12, 120 forms with said flat annulus shaped portion a right-angle whose bisector is directed towards the axis of the stator and respectively towards the front 2 and rear 3 flanges of the motor. Each of these two rings 12, 120 thus forms, with a wall 40, 400 forming a cylindrical extension of the surface of the bore of stator 4, a circular groove for housing a sealing element 13, 130. Here, each of these two sealing elements is an O seal made from a resilient material.

Thus, the circular annulus shaped surface of each of the two rings 12, 120 compresses each of the seals 13, 130 against each of the cylindrical outer annular surfaces 41 and 401 of walls 40, 400 respectively, integral with the ends of the bore of stator 4.

Similarly, the flat annulus shaped portion of each of the two rings 12, 120 compresses each of the seals 13, 130 respectively against the flat ring shaped end, or edge, 61 of sleeve 6 and against the flat ring shaped end, or edge, 71 of sleeve 7, respectively.

Thus, sealing contact between each of seals 12, 120 and stator 4 takes place along a cylindrical surface, whereas the sealing contact between each of seals 12, 120 and sleeves 6 and 7 housing the rotor 11 takes place along a flat annular surface. The result is that the existence in the gaps between the poles of zones in which the stator is no thicker than the walls 40, 400 does not prevent good sealing. In fact, in the zones where the flat annulus shaped portion of each of rings 12, 120 is not supported by stator 4, the rigidity of rings 12, 120 means that seals 13, 130 supported by these rings 12, 120 remain nevertheless compressed against edges 61 and 71 and provide good sealing. In addition, because the sealing between seals 13, 130 and the stator is provided along cylindrical annular surfaces 41 and 401, the end narrowing of the width of faces 51 and 52 in the zones between the poles has no influence on the sealing quality.

A shoulder 14, 140 formed in the ends of each of sleeves 6 and 7 may cooperate by contact with abutment surfaces 50, 500 of the stator, in the form of crenellations extending along an arc of a circle, providing mechanical locking of the stator in position and limiting the fouling up of the sealing elements 13, 130.

In a motor comprising such sealing elements, the rotor environment A and the stator environment B are isolated from each other and, at the same time, the rotor environment A is isolated from the outside environment, such a motor being particularly well adapted to devices for regulating dangerous or harmful gases as well as devices for regulating liquids.

What is claimed is:

1. A disengageable linear stepper electric motor comprising a multipole stator in the bore of which a rotor of smaller diameter revolves cycloidally, said motor further comprising sealing means disposed between the rotor environment and the stator environment for isolating said stator environment and so the environment outside the motor, from said rotor environment wherein said sealing means comprise resilient means and rigid means for supporting said resilient means and compressing them against two cylindrical annular surfaces integral respectively with the two ends of the bore of said stator and against the edges of two cylindrical sleeves housing said rotor.

2. The motor as claimed in claim 1, wherein said rigid means comprise bearing rings with an L shaped section.

3. The motor as claimed in claim 1, wherein said resilient means comprise O seals.

* * * * *